April 19, 1927.  W. T. WOODALL ET AL  1,625,384

DEVICE FOR JOINING OR BURNING BATTERY PLATES

Filed July 23, 1926   2 Sheets-Sheet 1

Inventor
William Thomas Woodall
Charles E. Girton
By Murray and Puzelter
Attorney April 19, 1927.  1,625,384
W. T. WOODALL ET AL
DEVICE FOR JOINING OR BURNING BATTERY PLATES
Filed July 23, 1926  2 Sheets-Sheet 2

Inventor
William Thomas Woodall
Charles E. Girton
By Murray and Bugelter
Attorney Patented Apr. 19, 1927.

1,625,384

UNITED STATES PATENT OFFICE.

WILLIAM THOMAS WOODALL AND CHARLES E. GIRTON, OF CINCINNATI, OHIO; SAID WOODALL ASSIGNOR TO SAID GIRTON.

DEVICE FOR JOINING OR BURNING BATTERY PLATES.

Application filed July 23, 1926. Serial No. 124,537.

This invention relates to improvements in devices for joining or burning battery plates.

An object of our invention is to provide a battery plate burner wherein the plates may be expeditiously handled and economically joined.

Another object of our invention is to provide a device wherein a set of plates may be joined on both sides of the device by an operator who may be stationed on but one side of the device before the plates are separated.

Another object of our invention is to provide a device wherein the plates after being joined may be readily removed by a new and efficient knock-out feature.

Another object of our invention is to provide a device of this type, all points of which may be brought to the position at which the operator may be stationed.

These and other objects are attained by the means described herein and disclosed in the accompanying drawings, in which.

Figure 1:
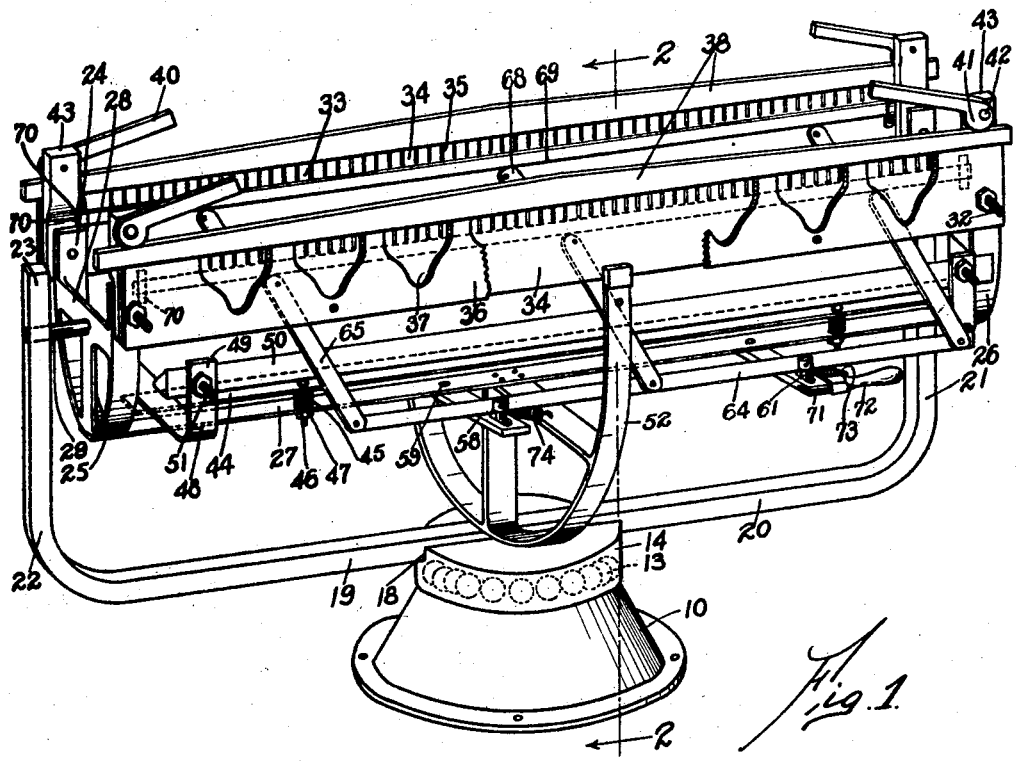
Fig. 1 is a perspective view of a device embodying our invention.

Our invention contemplates a base 10 having a groove 11 formed in the upper surface 12 of the base 10. The groove 11 is adapted to receive ball bearings 13 loosely mounted in the groove 11. A bearing or collar 14 may be mounted upon the base 10 rotating about a pivot 15 carried by the base 10 and bearing upon the balls 13. The base 10 may be provided with a notch 16 in which a complementary flange 17 carried by the collar or bearing 14 is received, whereby a dust proof structure results. The flange 17 also serves to prevent the inadvertent displacement of the ball bearings 13. It is readily evident from the foregoing structure that the collar or bearing member 14 may be freely and easily rotated on the balls 13 about the pivot 15.

The bearing 14 is provided with a groove 18 in which a longitudinal stationary U-shaped frame 19 may be secured. The stationary frame 19 comprises a base 20 having arms 21 and 22 extending upwardly therefrom. The arms 21 and 22 have pivotally mounted at their upper ends 23 a suitable movable frame 24.

The movable frame 24 comprises end members 25 and 26 spacedly secured by a longitudinal bar 27. The end members 25 and 26 are substantially a U shape and are provided with a cross brace 28 in which the pivot 29 extending from the uprights 21 and 22 is received. The arms 30 and 31 of the end members 25 and 26 have secured therein adjusting screws 32 for adjusting the plate holders 33. The plate holders 33 comprise a slotted bar 34 having slots 35 formed therein. The center distance of the slots 35 being equal to the distance between two positive or two negative plates of a storage battery. A second plate or mold back 36 having formed therein molding notches 37 is secured to the outer surface of the notched plate 35. The molding notches 37 being of a sufficient size to include the proper number of plates, namely, in a thirteen plate storage battery to include the seven positive plates or the six negative plates. The molding notch 37 is of the outline of a lug which is secured to the plates. The notch bar 34 and mold back 36 are carried by the adjusting screws 32 carried by the end members 25 and 26. A suitable clamp bar 38 may be provided to clamp the battery plates 39 in position after they have been placed within the notches 35 formed in the bar 34. A suitable clamping lever 40 having an eccentric 41 formed on one end thereof may be pivoted at 42 to the upper ends 43 of the end members 25 and 26. After the battery plates 39 have been placed in the slots 35 the clamp bar 38 may be mounted on the upper surface of the slotted bar 34 and mold back 36 and the levers 40 actuated about their pivotal mountings for securing the bar.

The longitudinal bar or movable frame base 27 carries a movable battery plate base 44 spaced from the bar 27 by means of adjusting springs 45 and adjusting screws 46 extending through the plate base 44 and frame base 27. It is readily evident that by means of the nut 47 the distance between the battery base and the frame base may be adjusted. The battery base 44 carries brackets 48 to the upper end 49 of which suitable centering bars 50 are secured. The bars 50 carry adjusting screws 51 which extend through the bracket 48 and are adjustable centerward of the device.

Figures 2, 4:
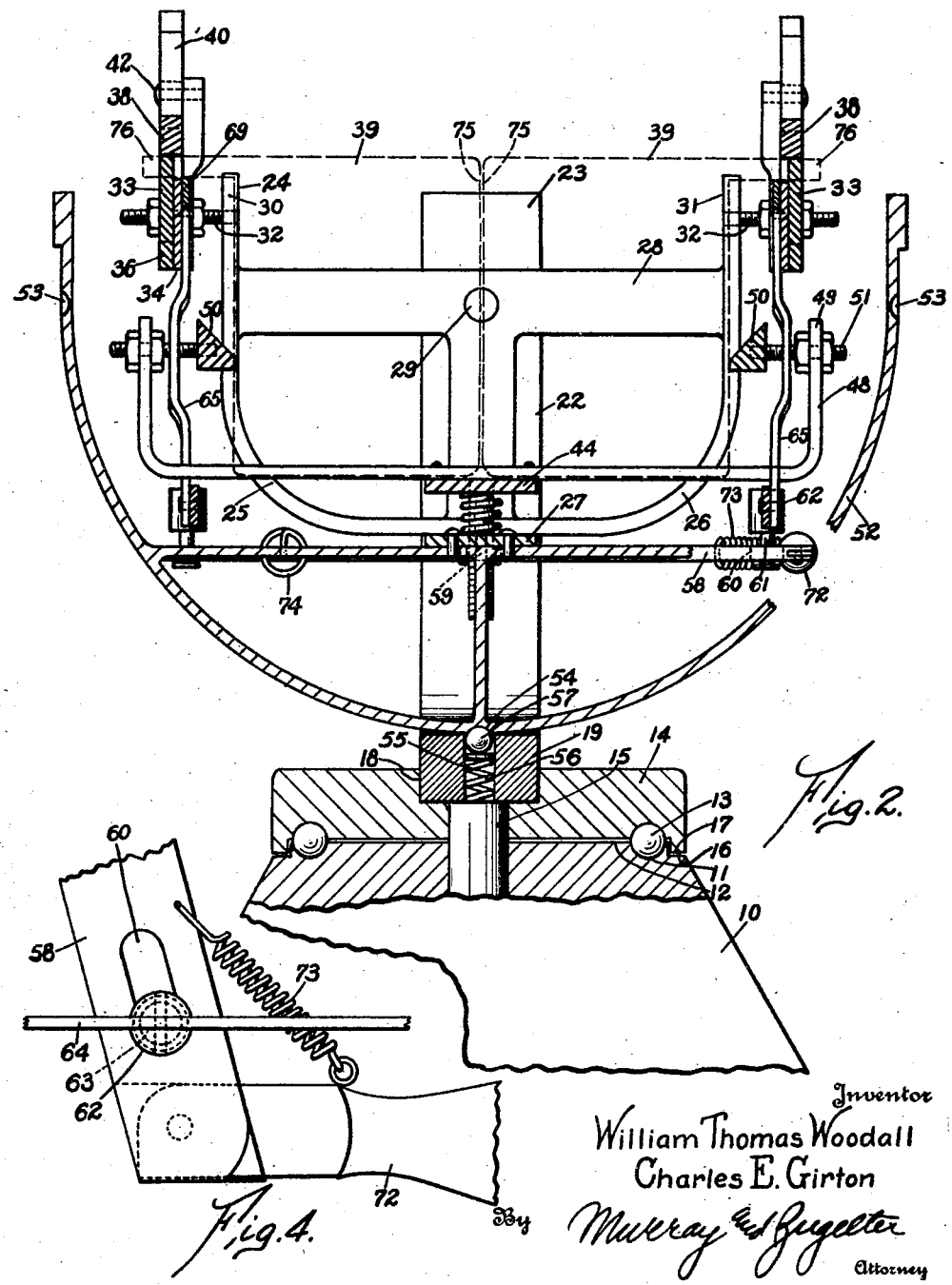
Fig. 2 is a sectional view on line 2—2 of Fig. 1.
Fig. 4 is a plan view taken on line 4—4 of Fig. 3.

The movable frame base 27 has secured to it a semi-circular actuating member 52 having depressions 53 formed in the outer surface of its arms and a third depression 54 formed in the outer surface midway between the depressions 53. The base 20 of the frame 19 is provided with a perforation 55 in which a suitable locking means is carried for locking the movable frame 24 in various positions. The locking means comprise an expansion spring 56 having its opposite ends in abutment upon the pivot 15 and a suitable locking ball 57. It is readily evident from Fig. 2 how the locking device operates.

Figure 3:
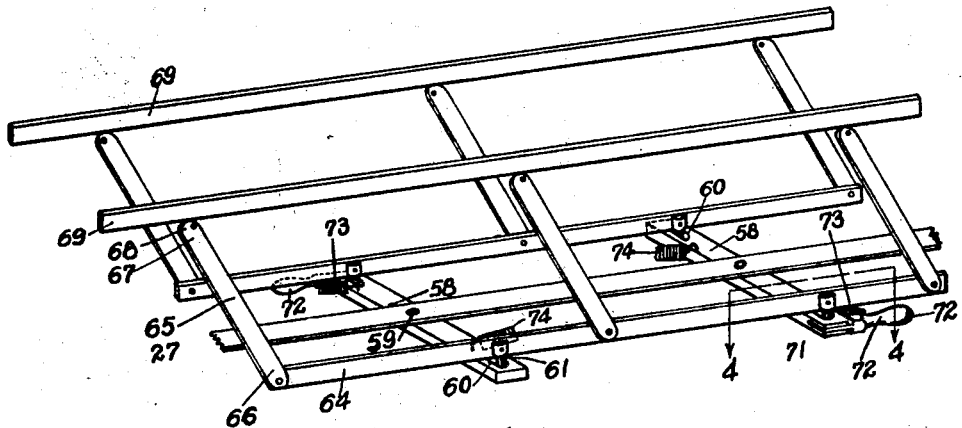
Fig. 3 is a perspective view of the knockout mechanism forming a detail of our invention.

The knock-out feature, shown in Fig. 3, is carried by the movable frame base 27 and comprises bars 58 pivoted intermediate their ends at 59 to the base 27. The opposite ends of the bars 58 are provided with elongated perforations 60 in which suitable pivots 61 are received. The upper ends 62 of the pivot 61 are provided with slots 63 in which the operating arm 64 is rigidly secured. Links 65 have one end 66 pivoted to the operating arm 64, and the opposite end 67 pivoted to the notched bar 34. The end 67 of the links 65 is provided with a cam face 68 abutting a suitable knock-out bar 69, the knock-out bar being carried by suitable brackets 70 secured to the notched bar 34. The cross bars 58 carried by the base 27 have formed in one end a suitable slot 71 in which an actuating handle 72 may be mounted, see Fig. 4. A spring 73 having its opposite ends secured to the handle 72 and the cross bar 58 is employed to retain the handle 72 within the body lines of the device as disclosed in Fig. 3. A second spring 74 having its opposite ends secured to the cross bar 58 and actuating member 52 may be employed for normally returning the parts to the position shown in Fig. 1 so that the knock-out bar 69 is normally below the lower edge of the slots 35.

The operation of our device is as follows:

We contemplate securing battery plates to one another along the edge 75, or the edge opposite to that which carries the plate lug 76 so that the lugs 76 will extend through and beyond the slotted bar 34 on opposite sides of our device. The clamp bars 38 are then placed upon the upper surface of the mold-back 36 and notched bar 34 and the handles 40 actuated to clamp the bar 38. The movable frame 24 is now actuated about the pivots 29 until the locking ball 54 sits in one of the depressions 53. The battery lug may now be positioned in the notches 37 and burned or secured to the plates mounted in the device. After one set has been secured the movable frame may be actuated about the pivots 29 until the ball 54 sits in the opposite depression 53. This, however, will place the battery plates in the reverse position to that in which they should be to efficiently burn or join the plates together. Wherefore the device will be actuated about the pivot 15 carried by the base 10. After the plates have been burned together on the second side, the movable frame is returned to the position shown in Fig. 2 or until the lock ball 57 is set in the depression 54. The lever 72 is now actuated to actuate the cross bar 58 and the operating arm 64, whereupon the cam face 68 forces up the knock-out bar 59 and lifts the battery plates out of the slots 35 formed in the slotted bar 34. Upon releasing the lever 72 the springs 73 and 74 return the knock-out elements to their normal position as shown in Fig. 1.

While we have shown our device as joining five battery plates, it is readily evident that by changing the mold-back 36 any number of plates may be included within the mold notch 37. It is also evident that by increasing the base 20 of the frame 19 and the other elements respectively, any number of sets of plates may be joined. For example, by making the mold-back 36 include ten mold notches 37 a sufficient number of plates may be joined to make the positive or negative elements of six and two thirds batteries in one setting. It is also evident that by providing one half of the mold back with notches 37 which include an additional plate holder 33, the positive and negative elements of a battery may be made at one setting, so that a ten notched mold back will make 3⅓ complete batteries. It must be evident from the foregoing that an operator need not move from his position in order to burn all of the plates carried by our device.

It should also be noted with a device of our invention the plates may be mounted in an expeditious manner because two plates are dropped into the notches immediately in front of the application and need not be treaded through the notches as is the case with the devices now generally used.

What we claim is:

1. In a battery plate burning jig of the class described, the combination of a standard, a revoluble base carried by the standard, a frame secured to the revoluble base, a battery plate holder pivotally carried by the frame and comprising end members secured in spaced relation by a longitudinal base, a notched plate carried by the end members and adapted to be adjusted laterally of the end members, a mold-back secured to the notched plate, a locking bar adapted to lie on the upper surface of the notched plate and mold-back, eccentric clamps carried by the end members for clamping the locking bar in position, a battery plate base carried by the longitudinal base, means for adjusting the distance between the battery plate base and the longitudinal base, a bracket carried by the battery plate base, a centering strip adjustably secured to the bracket for adjusting the plates to the center of the device, cross bars pivotally carried by the longitudinal base, an actuating arm connecting the cross bars at one end thereof, a lever carried by the cross bar, links having their opposite ends pivotally connected to the operating arm and the notched plate, a knockout bar slidably contacting the notched plate and abutting the ends of the links pivotally secured to the notched plate.

2. In a battery plate burning jig of the class described, the combination of a revoluble base, a frame secured to the revoluble base, a second frame pivotally mounted on the first frame and movable relative to the first frame, battery plate holding means adjustably mounted upon the movable frame and comprising a notched plate, cross bars pivotally carried by the movable frame, an actuating arm connecting the cross bars, links having their opposite ends pivotally connected to an actuating arm and notched plate, a cam formed on one end of the links, a knock-out bar slidably carried by the notched plate and abutting the cams, and a means carried by the cross bars for actuating the links and cams for moving the knock-out bar to dislodge the battery plates from the notches in the notched bar.

3. A battery plate burning jig of the class described, comprising a frame, a second frame movable relatively to the first frame and comprising end members, a notched plate carried by the end members and adapted to be adjusted laterally of the end members, a mold-back secured to the notched plate, means for dislodging the battery plates from the notches in the notched plate, an actuating member carried by the movable frame for oscillating the movable frame relative to the fixed frame and having depressions formed in its outer surface, and a means carried by the fixed frame cooperating with the depressions formed in the actuating member for locking the movable frame in adjusted positions.

4. A battery plate burning jig comprising a frame adapted to be actuated in a horizontal plane, a second frame pivotally mounted on the first frame and adapted to be oscillated in a vertical plane, means associated with the movable frame adapted to hold battery plates in spaced relation, means carried by the movable frame of actuating the said movable frame about its pivotal mounting, and means for locking the movable frame in adjusted positions relative to the fixed frame.

5. In a battery plate burning jig of the class described, the combination of a standard, a revoluble base carried by the standard, a frame secured to the revoluble base, a battery plate holder pivotally carried by the frame and comprising end members secured in spaced relation by a longitudinal base, a notched plate carried by the end members and adapted to be adjusted laterally of the end members, a mold-back secured to the notched plate, means for securing the battery plates in the holder after they have been placed in the notches, a battery plate base carried by the longitudinal base, means for adjusting the distance between the battery plate base and the longitudinal base, a bracket carried by the battery plate base, a centering strip adjustably secured to the bracket for adjusting the plates to the center of the device, and means for dislodging the battery plates after they have been burnt.

6. In a battery plate burning jig the combination of a standard, a revoluble base carried by the standard, a frame carried by the base, a second frame carried by the first frame, the second frame being adapted to be actuated relative to the first frame, and means for securing battery plates in spaced relation on the secondary frame preparatory to burning the plates together.

7. In a battery plate burning jig the combination of a frame, a battery plate holder pivotally carried by the frame and comprising end members secured in spaced relation by a longitudinal base, a notched plate carried by the end members and adapted to be adjusted laterally of the end members, a mold-back secured to the notched plate, a locking bar adapted to lie on the upper surface of the notched plate and mold-back, eccentric clamps carried by the end members for clamping the locking bar in position, a battery plate base carried by the longitudinal base, means for adjusting the distance between the battery plate base and the longitudinal base, and means for actuating the battery plate holder about its pivotal mounting.

In testimony whereof, we have hereunto subscribed our names this 10th day of July, 1926.

WILLIAM THOMAS WOODALL.
CHARLES E. GIRTON.